United States Patent [19]

Hsei et al.

[11] Patent Number: 4,792,373

[45] Date of Patent: Dec. 20, 1988

[54] HEAT SEALING APPARATUS

[75] Inventors: Paul K. Hsei; Jun-Ichi Meguro, both of Huntington Beach; William A. Stark; Arne L. Solberg, both of Costa Mesa, all of Calif.

[73] Assignee: Baxter Travenol Laboratories, Inc., Deerfield, Ill.

[21] Appl. No.: 746,232

[22] Filed: Jun. 18, 1985

[51] Int. Cl.[4] .................. B32B 31/20; B32B 31/04
[52] U.S. Cl. ..................... 156/497; 156/498; 156/581; 156/583.1; 156/583.4
[58] Field of Search ........... 156/228, 282, 292, 308.4, 156/497, 498, 581, 583.1, 583.4, 70, 219, 244.22, 275.1, 381, 379.8, 380.8, 69; 53/555, 367; 493/191, 190

[56] References Cited

U.S. PATENT DOCUMENTS

| | | | |
|---|---|---|---|
| 2,855,040 | 10/1958 | Gaines | 156/219 |
| 3,152,944 | 10/1964 | Monjonnier | 156/498 |
| 3,574,028 | 4/1971 | Hurst et al. | 156/228 |
| 3,793,115 | 2/1974 | Jindra | 156/381 |
| 3,823,052 | 7/1974 | Hargett | 156/220 |
| 3,938,298 | 2/1976 | Luhman et al. | 53/555 |
| 4,043,858 | 8/1977 | Danowitz | 156/251 |
| 4,169,002 | 9/1979 | Larson | 156/292 |
| 4,263,256 | 4/1981 | Morle | 156/220 |
| 4,519,862 | 5/1985 | Urai et al. | 156/498 |

FOREIGN PATENT DOCUMENTS 562432  3/1976  U.S.S.R. .................. 156/498

Primary Examiner—Michael W. Ball
Assistant Examiner—J. Davis
Attorney, Agent, or Firm—M. D. Hunter; P. C. Flattery; S. B. Fentress

[57] ABSTRACT

A system for heat sealing in conjunction a pair of plastic strips each of having a series of regularly spaced transverse pockets so that the pockets together form chambers separated by webs. The two pocketed strips to be joined are brought together and the strips heat sealed around the pockets to seal the chambers from one another while passing cooling fluid over the pockets so as to avoid distortion or collapse of the pockets.

7 Claims, 4 Drawing Sheets

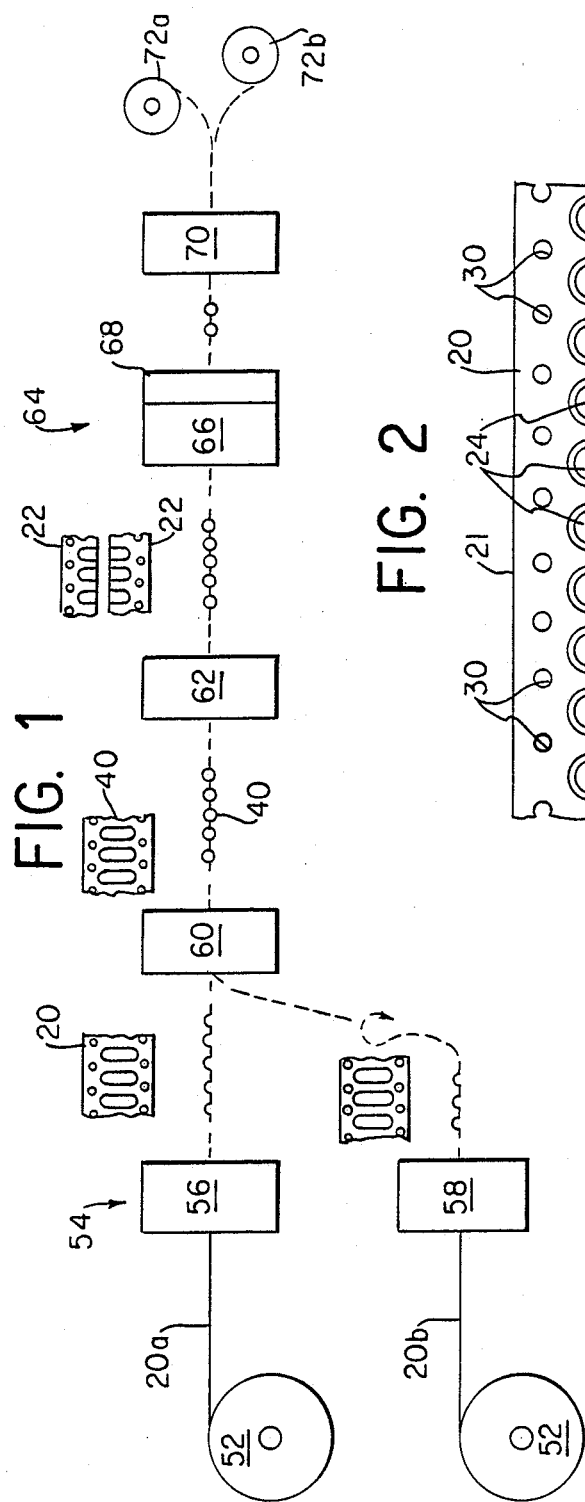
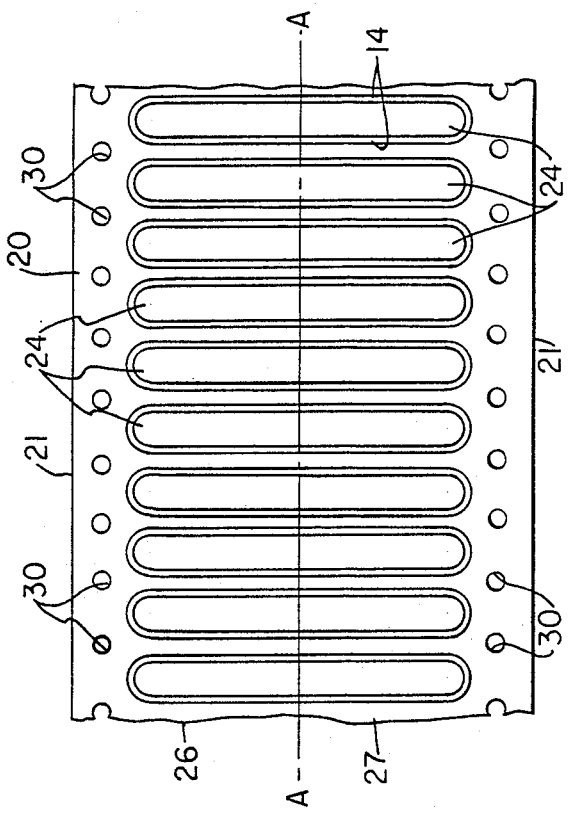

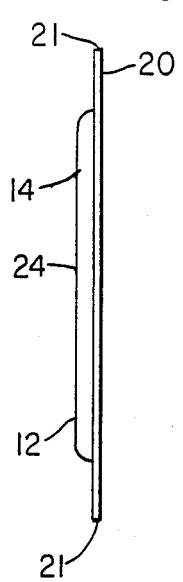
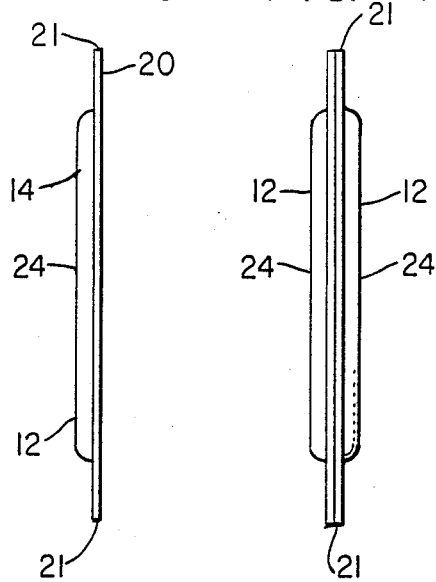
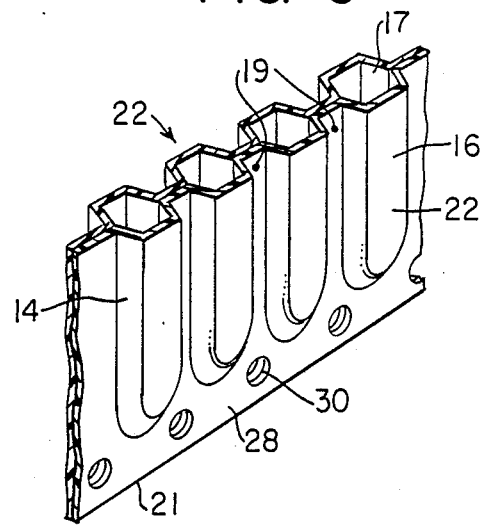
FIG. 3  FIG. 4  FIG. 5
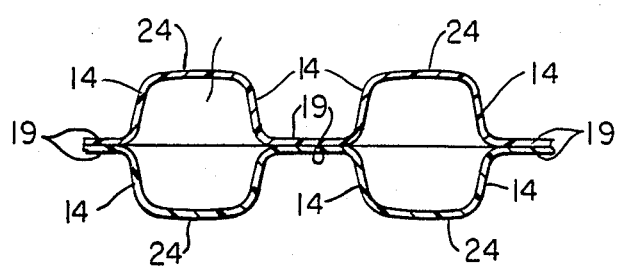
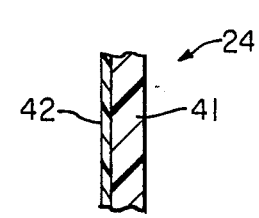
FIG. 6  FIG. 6A
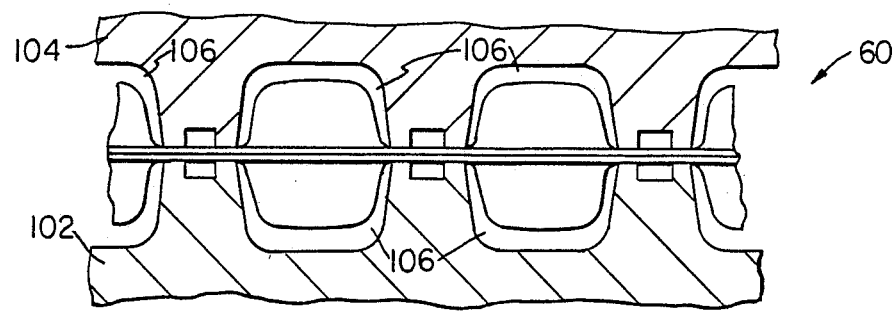
FIG. 7

HEAT SEALING APPARATUS

INTRODUCTION

This invention relates generally to methods and apparatus for heat sealing plastic strips, particularly in the manufacture of cuvettes for use in chemical analysis of fluid samples in an automated instrument and, more particularly, to flexible cuvette belts consisting of a plurality of integrally interconnected cuvettes which are designed to be transported through such an instrument.

BACKGROUND OF THE INVENTION

A variety of automated or semi-automated chemical analyzers are known which utilize cuvettes for the chemical testing of samples placed therein. Generally, a predetermined amount of liquid sample, such as biological fluid is placed in the cuvette which is then transported through the instrument. As the cuvette is transported, the instrument dispenses a quantity of reagent into the sample and monitors the resulting chemical reaction. Such monitoring is generally accomplished through use of an optical means which views the fluid sample through optically transparent portions of the cuvette.

In order to simplify the loading of the cuvettes into the instrument and facilitate their handling by the instrument once so loaded, proposals have been made to provide the cuvettes in the form of a continuous integral strip. The individual cuvettes of the strip are designed to be relatively rigid but the strip itself is provided with sufficient flexibility to ease its transport through the instrument.

Furthermore, by making the cuvettes in a continuous strip form, they can be manufactured relatively inexpensively from suitable plastic material, thereby permitting their disposal after use. This is an important feature since it avoids the requirement for washing the cuvettes after use and avoids any possibility of cross-contamination of fluid samples which could cause erroneous test results. A proposed cuvette system designed to meet these requirements is proposed in U.S. Pat. No. 4,263,256.

In commonly owned copending U.S. patent application Ser. No. 284,842 filed July 20, 1981 and entitles "Cuvette System For Automated Chemical Analyzer", now abandoned, the disclosure of which is hereby incorporated by reference in its entirety herein, there is described a cuvette belt which comprises a matching pair of formed elongated plastic strips which are joined together along corresponding faces thereof to form an integral belt. A series of regularly spaced cavities or chamber halves is formed transversely in each of the corresponding strip faces which define open-topped cuvette receptacles when the belt halves are joined. As described, the cuvette belt is made by forming strip plastic material with a series of regularly spaced transverse (laterally extending) elongated pockets so as to define two integral side-by-side belt halves. The formed strip is then divided longitudinally to separate the belt halves and the belt halves brought into register and joined together to form a completed cuvette belt.

Using such manufacturing techniques, cuvettes may be obtained with superior optical characteristics and dimensional accuracy previously obtainable only through use of injection molding techniques. This is important when optically analyzing samples in the cuvettes for which a precisely defined optical path through the cuvette is required. It is pointed out that it is possible by utilizing cold forming techniques to avoid optical degradation of the material due to heat. Further an optical portion of the material may be restrained by clamping or other forming techniques during the pocket forming operation to avoid stretching or other deformation of portions of the pocket which form the sides of the cuvette. In this manner essentially all stretching of the material during forming is limited to the side walls of the pockets and optical portions thereof are maintained stress-free and with a uniform thickness.

Reference is also made to commonly owned copending U.S. patent application Ser. No. 746,231 filed June 18, 1985, and entitled "Cuvette Belt Manufacture and Process", the disclosure of which application is hereby incorporated by reference in its entirety herein. In that application is disclosed an alternative method for making cuvette belts where they comprise a matching pair of plastic strips, each of which is formed with chamber halves, and which are joined together to form an integral cuvette belt with the chamber halves aligned to form the cuvettes.

According to that method, two strips of plastic material are identically formed with a series of regularly spaced transverse elongated pockets so as to define two integral side-by-side belt halves. The two formed strips are brought into register and joined together to form a composite strip defining two integral mirror image cuvette belts joined by their cuvette mouth ends. The composite strip is then divided longitudinally to separate the cuvette belts.

The present invention is particularly concerned with techniques for joining the formed plastic strips by heat sealing during the manufacture of such cuvettes while retaining the aforesaid optical characteristics.

SUMMARY OF THE INVENTION

To this end according to the invention, two formed strips to be joined are brought together in register with the pockets aligned to form chambers and the strips are heat sealed at least partially around the pockets so as to seal the chambers from one another while passing cooling fluid (such as air at room temperature) over the pockets during the heat sealing. In this way collapse or distortion of the pockets is avoided during heat sealing.

Preferably, in order to minimize and precisely control the application of the heat generated during the sealing operation, the strips are heat sealed along discrete narrow bands extending alongside the pockets with each band separate from the other bands.

Apparatus according to the invention includes first and second coacting heat sealing dies having heating surfaces for sealing the strips intermediate the pockets. A series of openings or cavities is provided in each of the heat sealer dies for receiving the pockets and the heating surfaces extend at least partially around each of the openings so as to operate to seal the chambers formed by the association of the strips to one another. Means is provided for introducing cooling fluid (such as air at room temperature) into these openings for cooling the heat sealer die cavities during heat sealing.

Where the strips have a web portion extending along at least a longitudinal side edge which is formed with a row of indexing perforations, the dies may include heating surfaces for sealing around the perforations. Also a narrow longitudinal heating surface may be provided for sealing the edges of the webs together outbound of the perforations.

In a preferred embodiment of heat sealing apparatus for sealing together two plastic strips in which the pockets together form closed chambers and the strips have webs with indexing perforations along each side, each opening is formed by a cavity in the die and each cavity has a central aperture in the floor thereof for enabling cooling air to be introduced into the cavity and exit apertures adjacent each end of the cavity for removal of the cooling air. With this arrangement the cooling air is induced to flow over the whole area of the pockets. The openings are each surrounded by a discrete narrow heat sealing surface separate from each other heat sealing surface and discrete narrow heat sealing surfaces are arranged to seal around each perforation. Further, a narrow, longitudinal, strip-like heating surface extends along each side of each die for sealing the strips along each edge outbound of the perforations. These strip-like heating surfaces interconnect the heating surfaces that seal around the perforations. Heat pipes can be used to improve alignment of indexing holes in the sealing dies.

DESCRIPTION OF THE DRAWINGS

Other features and advantages of the present invention will become apparent from the following description taken in conjunction with the accompanying drawings wherein:

FIG. 1 is a diagrammatic side elevation of an embodiment of automatic equipment for making cuvette belts from the strip plastic material incorporating heat sealing apparatus according to this invention, FIG. 2 is a top plan view of a strip of plastic material following formation thereof in a forming press of this invention, FIG. 3 is an end view of the formed strip shown in FIG. 2, FIG. 4 is an end view of a composite strip formed by joining together two formed strips as shown in FIG. 2, FIG. 5 is a perspective view of a cuvette belt produced by dividing longitudinally along its center line the composite strip of FIG. 4, FIG. 6 is a horizontal cross section through the cuvette belt shown in FIG. 5, FIG. 6a shows a wall section of a cuvette, FIG. 7 is a section through a heat sealing die assembly of a heat sealing apparatus according to this invention shown in the closed position which is taken along the line VII—VII of FIG. 9.

DESCRIPTION OF PREFERRED EMBODIMENTS

Figure 8:
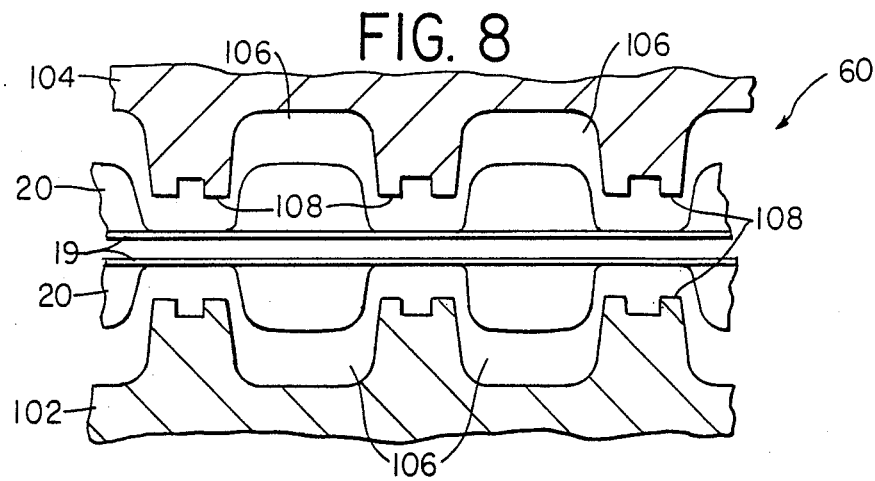
FIG. 8 is a view like that of FIG. 7 showing the dies open.

Referring to the drawings, FIG. 1 illustrates schematically an embodiment of an automatic system for producing plastic cuvette belts as shown in FIGS. 5 and 6 which includes heat sealing apparatus according to the present invention. Such automatic cuvette making system is described in detail in our aforesaid copending U.S. patent application Ser. No. 746,231, now abandoned, entitled "Cuvette Belt Manufacturing Apparatus and Process". However, such system is only described in outline herein to the extent necessary for an understanding of the subject of the present invention. For a detailed understanding of that system, reference should be had to the aforesaid pending application.

Referring now to FIG. 1, there is shown one embodiment of the apparatus for making cuvette belts from strip plastic material which is advanced in turn to an in-line series of processing stations to produce the completed belts. The apparatus illustrated simultaneously forms two cuvette belts 22 from two strips of plastic material 20.

Each strip 20 is fed from a reel 52 and is formed at a forming station 54 in a forming press 56, 58 with regularly spaced, transverse pockets 12 so as to define two integral side by side mirror image belt halves (FIGS. 2 and 3). The two formed strips are then brought into face to face register and joined together at a sealing station 60 to form two integral side by side mirror image cuvette belts (FIG. 4). The joined strips are thereafter slit longitudinally along their centerline at a slitting station 62 to produce two identical cuvette belts 22 in a single operation (one of which is shown in FIGS. 5 and 6).

The cuvette belts 22 are formed from preformed strips of plastic material which are suitably obtained by slitting sheet stock material into strips. These strips should be of sufficient length to provide completed cuvette belts 22 of the desired length and in particular of sufficient length to permit the continuous operation of an automated clinical analyzer in which they are to be used. For example, the desired length of a cuvette belt for use in a Paramax Analytical System as manufactured by American Hospital Supply Corporation is 2,000 cuvettes long.

An important feature of a cuvette belt for use in such an analyzer is that the individual cuvettes have closely controlled dimensional accuracy and provide a precisely defined optical path through the cuvette. It has been found that copolyester or vinyl plastic strip stock in thickness of 0.005 to 0.010 inch provide satisfactory results when formed according to the present invention. A suitable example of such material is KODAR brand thermo-plastic copolyester resin manufactured by Eastman Chemical Co.

In order to facilitate the fabrication and the assembly of the cuvette belt, the strip stock is preferrably a laminate, having a layer of easily heat sealable and biologically inert material such as SURLYN brand Ionomer resin material manufactured E. I. DuPont de Nemours and Co., Inc. As shown in FIG. 6a, the SURLYN 41 is provided on the inside of the KODAR 42 in the finished cuvette.

In the manufacture of cuvette belt 22 using the apparatus and process of this invention, two strips 20 of laminate stock plastic material as described above are identically formed with regularly spaced, elongated transverse pocket 12, formed pocket, as shown in FIGS. 2 and 3. Each formed strip defines two integral side by side image belt halves 26, 27. The pockets are formed of narrow, shallow indentations having a regularly rectangular shape utilizing cold forming techniques to avoid any optical degradation of the strip material due to heat.

An optical portion is formed in base portion 24 of each pocket 12 by restraining the base portion by clamping or other forming techniques during the pocket forming operation to avoid stretching or other deformation there which would be detrimental to its optical performance. In this manner essentially all stretching of the strip material during forming is limited to the portions forming the side walls 14 of the pockets (which eventually form the end walls of the resulting cuvettes; FIG. 5) and the optical portions 24 are maintained stress-free and with a uniform thickness.

During forming, a series of regularly spaced indexing perforations 30 are formed along opposite longitudinal edges of the strip material. These perforations 30 are utilize in the clinical analyzer in which the cuvette belts 22 are to be used precisely to control the transport of the cuvettes through the analyzers. Perforations 30 may also be used in the apparatus of FIG. 1 for driving the formed strips therethrough for subsequent processing and in particular accurately aligning the strips when they are brought together in precise registration prior to joining the strips together at the sealing station 60 in the manner explained below.

Strip forming apparatus particularly suitable for use in the apparatus in FIG. 1 is described in commonly owned co-pending U.S. patent application Ser. No. 746,233 filed concurrently herewith, now U.S. Pat. No. 4,685,880, and entitled "Cuvette Belts and Manufacture of Same", the disclosure of which hereby incorporated by reference in its entirety herein.

After formation of the pocket 12, the two strips are brought together in face to face relationship as shown in FIG. 4 with the pockets and perforations 30 in precise registration and so that the pairs of opposing pockets 12 together form closed chambers 18. The registered strips are then each sealed together to form a composite strip 40 defining two integral side by side mirror image cuvette belts joined together by what will become their mouths or open ends when they are subsequently slit.

If the two strips 20 are formed in a mirror image relation with their open pockets 12 facing other, they can straight forwardly be brought together in the appropriate face to face relation. However, it is preferred to form the strips one above or adjacent the other with their open faces both facing downwardly, in which event the lower strip 20b must be twisted through 180° about its longitudinal axis (as shown in FIG. 1) prior to bringing the strips 20 together.

It has been found that the formed strips 20 may be joined together by a heat sealing process at lower temperature if a laminate material such as SURLYN is utilized, as described in detail below.

Following the heat sealing step, the composite strip 40 is advanced to the slitter 62 where it is divided longitudinally down its center line to separate the two cuvette belts. The two completed cuvette belts 22 are each as shown in FIGS. 5 and 6. They comprise a series of open-top chambers 17 separated by thin webs 19 having a web-like transport area 28 along its lower edge having the indexing perforation 34 therein. As seen particularly in FIG. 6, the cuvettes are generally rectangular in cross section, and in order to provide a precise optical path the side walls are made parallel. Instead of being parallel the side walls of the cuvette may be deliberately given a convex or outwardly curved profile.

Following slitting, completed cuvette belts are advanced to an inspection station 64 where they are checked for defects. Associated with the inspection station may be a leak detector 66 and a marking device 68 for applying a machine readable mark to cuvettes 40 in response to detection thereof. This mark is read at a cutting station 70 arranged following the inspection station 64 to cause the cuvette belt 22 to be cut ahead of and behind the cuvette 40 to remove it from the cuvette belt before the belt is wound in a storage spool. Preferably, the cutting station includes a counter which counts a predetermined number of cuvettes following a faulty cuvette before effecting the second cut to avoid unnecessary operation of the cutter in the event of a faulty length of cuvette belt 22 occurring.

Reference is made above to the importance of the optical characteristics of cuvettes used in analysis equipment employing photoanalysis of samples contained in the cuvettes. It is thus important that during the joining together of the formed strips they are not degraded, e.g. by deformation of the pocket. The present invention is concerned with a heat sealing system for such purpose which aims to eliminate distortion of the formed strips being joined. An embodiment of heat sealing apparatus 60 suitable for use in the processing line of FIG. 1 will now be described with reference to FIGS. 7 to 12.

The heat sealing apparatus 60 comprises a movable lower sealing die 102 and movable upper sealing die 104. The active surface profiles of the dies are mirror images of one another and since they are symmetrical both have the profiles shown in FIG. 10. Each die 102, 104 has a series of transverse cavities 106 for receiving the pockets 14 of the formed strips being joined. Surrounding each cavity 106 is a narrow discrete heating rib 108 which is separate from all other ribs 108. Along each side of the die extends a row of annular heating ribs 110 which serve to seal around the indexing perforations 30 of the strips being joined. Further, a longitudinal heating rib 112 extends along each edge of the die outboard of the ribs 110 for sealing the edges of the strips. Preferably, as shown, the ribs 110 are integral with the ribs 112.

Figure 9:
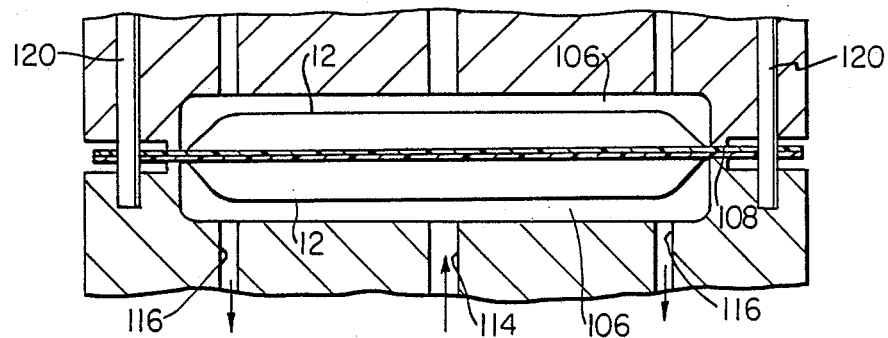
FIG. 9 is a section through the die assembly along the line IX—IX of FIG. 7.
Figure 10:
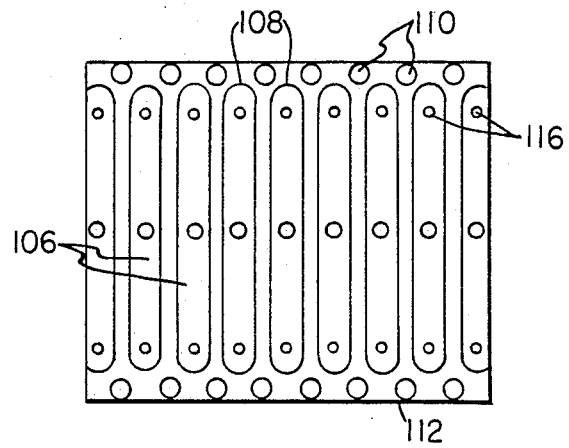
FIG. 10 is a top plan view of one of the dies.
Figure 11:
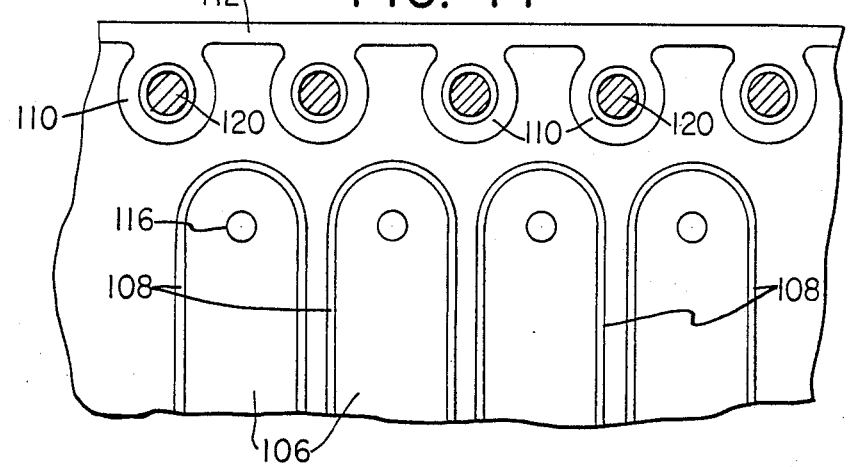
FIG. 11 is an enlarged top plan view showing part of the die seen in FIG. 10.

When the dies come together with a pair of formed strips 20 therebetween as shown in FIGS. 7 and 9, the webs 19 between the pockets 14 and the transport area 28 are clamped together by the ribs 108, 110, and 112. Heating of these ribs causes the strips to be sealed along corresponding lines to seal the cuvette chambers 18 from each other and seal around the perforations 30 and along the edges of the transport areas 28.

It will also be seen from FIGS. 7 and 9 that there is a space around each pocket between the pocket and the wall of the associated cavity when the dies come together.

In accordance with a feature of the invention, during the heat sealing operation, cooling fluid, e.g. air, is passed through the cavities 106 so as to flow through these spaces over the pockets. This has the effect of avoiding distortion of the pockets during heat sealing, which is assisted by the limited heat application to the strips through the narrow heating ribs.

As illustrated, air is enabled to be injected into each cavity 106 through a aperture 114 in the base of the cavity at or near its center and flows over the pockets and is pulled out through two exit apertures 116 arranged in the base of the cavity near each end thereof. This flow can be caused by a vacuum being pulled through the exit apertures 116. As a result, air is pulled through the apertures 114 into the cavities near the center of the cavity. This arrangement induces the cooling air to pass over the whole pocket.

Figure 12:
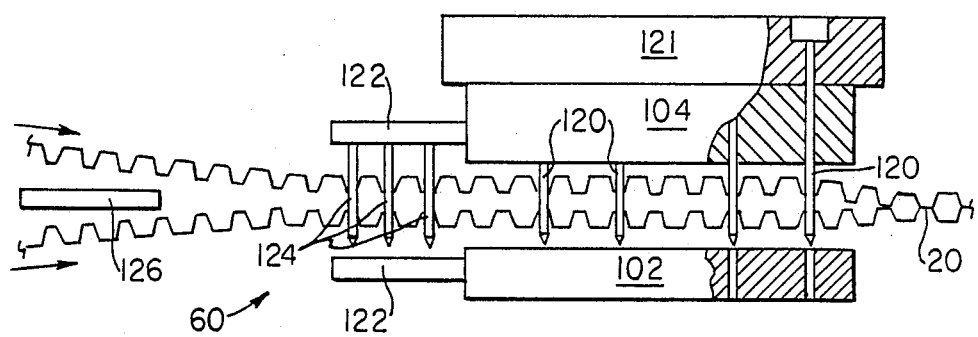
FIG. 12 is a further schematic view of the dies showing how the strips being joined are aligned.

In order to align the strips 20 accurately in the sealer 60, heat pipe locator pins 120 can project through the indexing holes in all or some of the annular heating ribs 110 on the top die which pass through the indexing perforations 30 in the strips 20 and into corresponding holes in the other die. The number of pins 120 and their mounting on the top or bottom is optional. Such heat pipe pins stay cool despite the surrounding high temperature of the heat sealer die. Suitably, the pins 120 are those sold under the tradename "ISOPIPE" and in the embodiment shown are attached to the cooling plate portion 121 of the die as shown in FIG. 12. The pins 120 are hollow and are kept cool by being filled by a cooling material such as ethanol. Such cooling pipes are supplied by Master Unit Die Company of Greenville, Mich. Another suitable device for this purpose is sold under the name "Heat Pipe" by KONA Company, Gloucester, Mass.

FIG. 12 also shows how the strips 20 are preferably aligned upstream of the sealer 60 by extensions 122 on the dies, the upper (optionally lower) one of which carry further locator or alignment pins 124. In order to prevent the two strips sticking together (due to a characteristic of SURLYN film) in the area between the extensions 122, they can be kept separate by separator plate 126 which keeps them separate until they are located by the alignment pins 124. Plate 126 can be fixedly attached to the stationary frame of the sealing press in any suitable manner.

Although particular configuration and features of the present invention have been discussed in connection with the above described preferred embodiments thereof, it should be understood that those skilled in the art may make various changes, modifications, and substitutions thereto without departing from the spirit and scope of the invention as defined in the appended claims.

We claim:

1. Apparatus for heat sealing in conjunction a pair of plastic strips each having a series of regularly spaced transverse pockets separated by web portions so that the pockets together form chambers, and in which the web portion of each strip extends along at least one longitudinal side edge and is formed therealong with a row of indexing perforations, comprising:
   first and second coacting heat sealing dies each having heating surfaces for heat sealing the strips together intermediate the pockets,
   series of openings in each of said dies, each opening being adapted to receive one of said pockets with said pocket spaced therewithin, said heating surfaces extending at least partially around each of said openings so as to operate to seal the chambers, formed by the association of the strips, from one another,
   means for engaging said web portions of said strips for aligning said strips with respect to one another and with respect to said openings, and
   means for introducing cooling fluid into said openings so that it flows over the surfaces of said pockets for cooling said pockets received therein during heat sealing,
   said dies including heating surfaces separate from the heating surfaces extending around said openings for sealing around said perforations,
   at least one of said heat sealing dies having at least one locator pin means which enters an indexing perforation in the web of each said strip to align said strips with respect to each other and with respect to said openings.

2. Heat sealing apparatus as defined in claim 1 in which said locator pin means is a heat pipe which remains cool despite the surrounding high temperature of the heat sealer die.

3. Apparatus for heat sealing in conjunction a pair of plastic strips each formed with a series of regularly spaced transverse pockets separated by web portions to form two integral mirror image side-by-side cuvette belts, comprising:
   first and second coacting heat sealing dies each having heating surfaces for sealing the strips together extending around openings adapted to receive said pockets with one said pocket in each opening and each said pocket spaced within the respective opening,
   means for engaging said web portions of said strips for aligning said strips with respect to one another and with respect to said openings, and
   means for introducing cooling fluid into said openings so that it flows over the surfaces of said pockets for cooling the pockets received therein during heat sealing,
   said openings being defined by cavities in said dies and there being provided in the base of each cavity, a central entry aperture for the introduction of cooling fluid and exit apertures adjacent each end for the outflow of the cooling fluid.

4. Apparatus for heat sealing in conjunction a pair of plastic strips each formed with a series of regularly spaced transverse pockets separated by web portions to form two integral mirror image side-by-side cuvette belts, in which the web portions are formed along each longitudinal edge with a row of indexing perforations, said apparatus comprising:
   first and second coacting heat sealing dies each having heating surfaces for sealing the strips together extending around openings adapted to receive said pockets with one said pocket in each opening and each said pocket spaced within the respective opening,
   means for engaging said web portions of said strips for aligning said strips with respect to one another and with respect to said openings, and
   means for introducing cooling fluid into said openings so that it flows over the surfaces of said pockets for cooling the pockets received therein during heat sealing,
   said sealing dies including heating surfaces for sealing around said perforations, and said aligning means including a plurality of locator pins which each enter an indexing perforation in the web portion of each strip.

5. Heat sealing apparatus as defined in claim 4 in which said heating surfaces for sealing around said perforations are discrete narrow surfaces separate from one another.

6. Heat sealing apparatus as defined in claim 4 including a narrow longitudinal heating surface along each side of each die for sealing the strips along each edge outbound of the perforations.

7. Heat sealing apparatus as defined in claim 6, in which said heating surfaces for sealing said perforations are discrete narrow surfaces separate from one another and said narrow longitudinal heating surfaces are each integral with the associated heating surfaces for sealing around said perforations

* * * * *